June 27, 1961

H. G. DIETZ 2,990,462

STEPPER SWITCH AND TIMER OPERATIVE AT MULTIPLE TIME
INTERVALS AND CONTROL MEANS FOR INITIATION
AND ADJUSTMENT THEREOF

Filed March 27, 1957

INVENTOR.
HENRY G. DIETZ
BY
ATTORNEY

June 27, 1961 H. G. DIETZ 2,990,462
STEPPER SWITCH AND TIMER OPERATIVE AT MULTIPLE TIME
INTERVALS AND CONTROL MEANS FOR INITIATION
AND ADJUSTMENT THEREOF
Filed March 27, 1957 3 Sheets-Sheet 2

INVENTOR.
HENRY G. DIETZ
BY
ATTORNEY

United States Patent Office 2,990,462
Patented June 27, 1961

2,990,462
STEPPER SWITCH AND TIMER OPERATIVE AT MULTIPLE TIME INTERVALS AND CONTROL MEANS FOR INITIATION AND ADJUSTMENT THEREOF
Henry George Dietz, Forest Hills, N.Y., assignor to Henry G. Dietz Co., Inc., Long Island City, N.Y., a corporation of New York
Filed Mar. 27, 1957, Ser. No. 648,976
18 Claims. (Cl. 200—105)

This invention relates to electrical control switches and is particularly directed to switches which operate over predetermined periods, or cycles and are known as "stepper switches." It is directed primarily to switches which are actuated in such a manner as to open and close a plurality of circuits individually and independently for any time interval selected from a preadjusted group of step intervals.

The primary object of the invention is to provide a time interval or stepper switch, which may be utilized for controlling the flow of current to various types of industrial apparatus of the types requiring fairly large supplies of current, and in which it is essential that the individual circuits be energized at accurately predetermined times, and that each circuit independently remain open for a predetermined readily adjustable time interval or step.

Another object of my invention is to provide means so that a number of timed operation switching means, apparatus or operations can be programmed in a preselected sequence or cycle, and where such apparatus or operation can be capable of being independently preselected for changes without effecting changes in any other timed operations or switching steps.

While stepper switches of various types are available, they are generally suitable for operation at a series of equally timed regularly sequential relatively short time intervals which are repeated over a sustained period, and in which the apparatus controlled requires a relatively small flow of current in order to actuate them, such as various types of electronically controlled devices.

With switches of this type it is generally necessary to provide amplifiers of various types in order to render them suitable for use on industrial apparatus, and the cycling of industrial equipment.

Another object of this invention is to provide a timed stepper switching device which can simulate a multiple cam time interval switch, where each cam is used to control a number of on and off periods of a circuit by means of the operation of a snap-action switch, the number of snap-action switches being equal to the number of cams.

Another feature of the construction is that various means are provided for independently initiating each switching step and for selecting or varying the time interval during which the current remains on at each switch actuation.

Another object of this invention is to maintain a high degree of accuracy of alignment of one snap-action switch with another so that in ordinary operation, switches which are actuated by individual control discs can be set to operate simultaneously with an accuracy unobtainable in ordinary cam controlled time interval or stepping switches.

Another object of my invention is to provide a number of timing ranges which can be preselected for any interval of time, coupled with various means of selecting and initiating the switching action or switching steps, and means for selecting one of plurality of operating time intervals by various means to suit the requirements of a particular operation.

Another feature of the invention is that individual time intervals or switching steps are determined by individual timing units such as air-controlled bellows, mounted in time delay relays or similar devices, in such a manner that an individual switching step, or a plurality of switching steps of adjustable and varying duration and sequence may be established.

A major feature of the invention is that two or more time interval devices may be individually mounted each in an individual time delay relay, the desired time interval or step required for each switching step being preselected from one of a group of timing devices or time delay relays.

Another feature of the apparatus is that individual or multiple means are provided for limiting or stopping the apparatus at a predetermined point in the cycle of operations, and for reinitiating the operation or bypassing the stopping means by a remotely mounted apparatus.

Another feature of the invention is that a plurality of time delay relays is provided, each of which is equipped with a separate adjustable time interval or switching step establishing unit, several independent means being provided for limiting the overall operating sequence of the unit at a predetermined time, and for reinitiating the operation of the unit, either before or after the sequence limiting device goes into operation, by remotely controllable means.

A major feature of the invention is that various means are provided for transmitting the switching steps or the time intervals to remotely located apparatus which is controlled thereby, the particular transmission means being constructed and selected in such a manner as to suit each specific operating requirement.

Another feature of the invention is that multiple individually adjustable means is provided for transmitting to the apparatus to be controlled, the time intervals or switching steps established by the apparatus. This multiple transmitting means is also accompanied by adjustable means for adjustably limiting the overall period during which the timing cycles are operated on individual pieces of apparatus, with means provided for bypassing such interval limiting means or for reinitiating the operation of the timer unit after it is cut out of operation by the overall cycle limiting device.

A major feature of the apparatus is that essentially the same operating elements may be incorporated in a device which is utilized essentially as a stepper switch, or as a multiple interval preselected timer, the essential difference being primarily in the wiring circuit utilized and in the number of variable time interval adjustable time delay relays which are incorporated in each circuit.

Another feature of the device is that it can readily to expanded to meet the requirements of a wide variety of operational units, essentially the same timing and switching step controlling elements being utilized, the changes or variations being effected by varying the number of the time interval establishing devices used, and by varying the type of transmission apparatus employed for transmitting the switching steps or time intervals to individual pieces of apparatus to be controlled thereby.

Another object of my invention is to provide a highly flexible and convenient arrangement, which permits the utilization of essentially the same apparatus for various applications without discarding or adding of parts.

Other objects of my invention become readily apparent when applied to stepping and switching applications which require that:

The time of any switching operation may be preselected without affecting changes in the time of any other individual or group of switching operations already preselected.

Any switching interval or step can be added, dropped out, or modified without affecting any other individual or group of switching steps already preselected or established.

The sequence of switching intervals or steps can be changed to allow for a complete new sequence or range of switching intervals or steps.

Any number of pieces of apparatus or individual switching steps or sequences can be performed by ganging up several individual units, or setting them up for multiple operation.

A preselected sequence of timed switching steps or sequences can be initiated by momentarily closing a single control switch.

A preselected formula for a sequence of switching intervals or steps can be infinitely repeated, the accuracy being maintained over the entire cycle of sequences.

The accompanying drawings, illustrative of one embodiment of various parts of my invention and various modifications and structural and operating variations thereof, together with the description of their construction, the range of electrical circuits connecting the various elements thereof, and the method of operation thereof will serve to clarify further objects and advantages of my invention.

It will be understood that the following description of the construction and the method of operation and utilization of the stepper switch and timer operative at multiple time intervals, the control means therefor and the various circuits and elements thereof, is intended as explanatory of the invention and not restrictive thereof.

In the drawings, the same reference numerals designate the same parts throughout the various views except where otherwise indicated.

Figure 1:
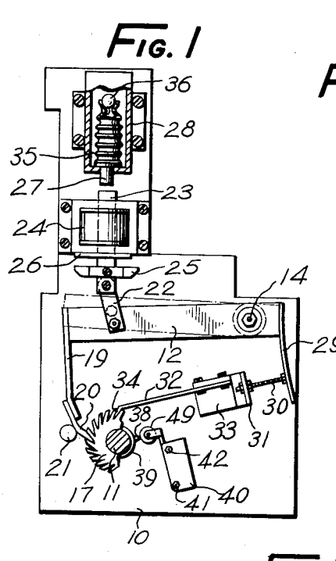
FIG. 1 represents a side elevation of the support panel and actuating mechanism of one embodiment of the stepper switch shown in FIG. 2, showing a pivoted control lever, the plate springs attached to the ends of the control lever, a ratchet wheel mounted on a support shaft actuated by a spring controlled ratchet attached to the plate spring at one end of the control lever, a solenoid, the actuation of which varies the position of the control lever, a snap-action switch actuated by a radially positioned projecting pin attached to the support shaft, and a time delay relay time interval control member controlled by the solenoid plunger.
Figure 2:
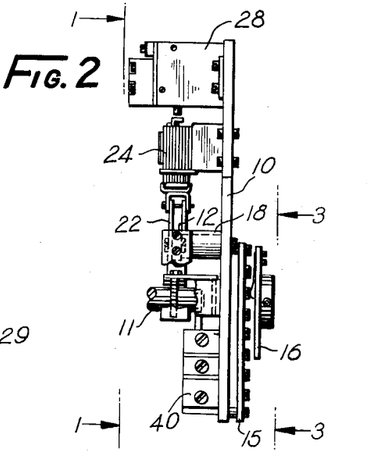
FIG. 2 represents a front elevation of the stepper switch mechanism shown in FIG. 1, showing the control lever, a solenoid used to elevate the control lever, a time delay relay control member operated in one direction by the plunger of the solenoid, and a commutator panel and contact disc combination provided to transmit to an externally mounted apparatus the switching steps as determined by the time delay relay.

One embodiment of the stepper switch mechanism, shown in FIGS. 1 and 2, is supported by a substantially vertical side plate 10, in which a control shaft 11 is trunnioned, the control shaft being substantially perpendicular to the side plate. A control lever 12 pivotally supported by a pivot pin 14, is mounted adjacent the forward face of the side plate above the control shaft 11.

A commutator panel 15 is mounted adjacent the outer face of the side plate 10, right-hand, FIG. 2, a contact disc 16 rotatably supported by the control shaft being provided to selectively transmit the switching steps and time intervals to an externally mounted mechanism to be controlled thereby in a manner hereinafter described in greater detail.

A ratchet wheel 17 having a plurality of radially positioned ratchet teeth 17a around the outer circumference thereof, is fixedly attached to the control shaft 11 below the control lever 12.

The ratchet wheel and other parts of the actuating mechanism of the stepper switch are controlled by the control lever 12, one end of which is pivotally supported by a pivot pin or stud 14 attached to the side plate 10, the control lever being spacedly located relative to the inner face of the side plate by means of a spacer 18 mounted on the pivot pin 14.

A plate spring 19 of arcuate contour is attached to the outer end of the pivoted control lever 12, opposite the pivoted end thereof. The plate spring 19 has a ratchet tip 20 attached to the lower end thereof, the lip at the lower end of the ratchet tip, which fits into the tooth spaces beween the ratchet teeth 17a of the ratchet wheel being operative to control the rotary movement of the ratchet wheel, in the manner shown in FIGS. 1 and 4. The ratchet tip 20, above the toothed end thereof, is of arcuate contour, a substantially cylindrical pin 21 fixedly attached to the inner face of the side plate engaging the rear surface of the ratchet tip to guide the toothed end of the ratchet tip and direct the lip thereof into the space between the teeth 17a of the ratchet wheel in the manner shown in FIG. 4.

A pair of links 22 pivotally attached to the outer end of the control lever 12, left-hand, FIG. 1, is pivotally connected to the lower end of a plunger 23, reciprocatingly fitted to a solenoid coil 24, mounted on the inner face of the side plate 10, left-hand, FIG. 2, above the outer end of the control lever 12, as shown in FIG. 1.

A shoe 25 is attached to the lower end of the plunger 23 of the solenoid, the upper end of the shoe serving as a stop to limit the upward movement of the solenoid plunger. In order to reduce the shock and noise to a minimum when the solenoid plunger is elevated, a rubber or other type of resilient pad 26 is attached to the bottom of the solenoid coil, the shoe 25 engaging the resilient pad in order to limit the upward movement of the solenoid plunger 23.

The upper end of the solenoid plunger 23 engages the bottom of a depending plunger 27 reciprocatingly fitted to a time delay relay 28 mounted above the solenoid 24, and supported by the side plate in the manner shown in FIGS. 1 and 2.

Figures 4, 7, 10, 11:
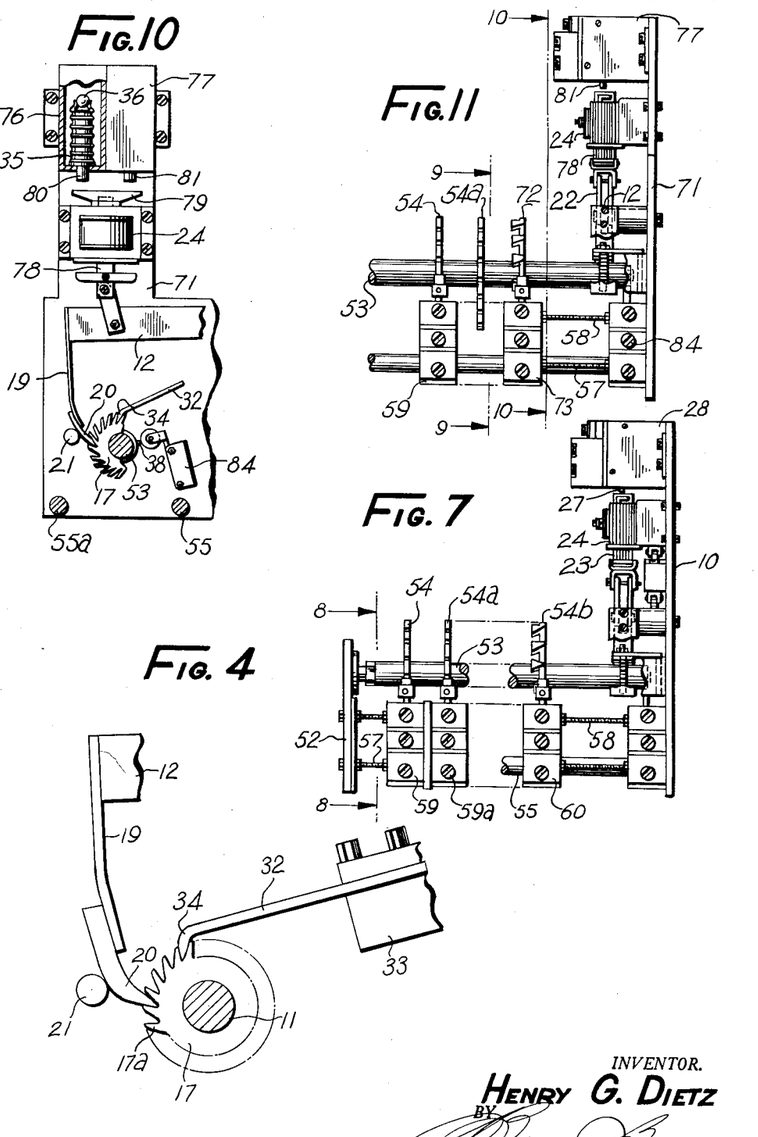
FIG. 4 represents an enlarged side elevation of the ratchet wheel and support shaft shown in FIG. 1, showing the spring supported ratchet tip attached to the free end of the control lever, a pin provided to maintain the ratchet tip in engagement with the teeth of the ratchet wheel, and an auxiliary plate spring supported by a bracket attached to the side plate to limit the angular movement of the ratchet wheel.
FIG. 7 is a front elevation of a modification of the stepper switch mechanism shown in FIGS. 1 and 2, showing a series of control discs mounted on the support shaft, each of which controls an individual snap-action switch to transmit to an externally mounted apparatus the switching steps established by the time delay relay, the control lever which controls the angular movement of the control discs, also a time delay relay and a solenoid used to actuate the control lever and determine the timing of the switching steps.
FIG. 10 represents a left-hand side elevation of another modification of the actuating mechanism shown in FIG. 7, in the form of a timer apparatus, showing a portion of the control lever, the ratchet wheel and spring supported ratchet tip mechanism, a solenoid provided to control the angular position of the control lever, a pair of time delay relay time interval control members to selectively control the time intervals, and a time delay relay plunger control member attached to the solenoid plunger for simultaneously elevating the plungers of both time delay relays.
FIG. 11 is a front elevation similar to FIG. 7, of the time interval timer mechanism shown in FIG. 10, showing the actuating mechanism similar to that shown in FIG. 7, the support shaft supported by a pair of side plates, a series of control discs, and snap-action switches used in conjunction therewith, similar to those shown in FIG. 7, and a right-end or zeroing control disc with an individual snap-action switch actuated thereby mounted adjacent the right-hand side plate, also showing the solenoid, the time delay relays and the plungers thereof and the time delay relay plunger actuating member attached to the solenoid plunger.

As shown in FIGS. 1 and 4, a ratchet wheel 17 is mounted on the control shaft in substantial alignment with the center of the outer end of the control lever, the ratchet teeth 17a around the outer circumference of the ratchet wheel being located in such a position as to engage the lip at the lower end of the ratchet tip attached to the lower end of the plate spring in the manner hereinbefore described.

Another plate spring 29 of arcuate contour is attached to the pivoted end of the control lever, adjacent the pivot pin 14, as shown in FIG. 1.

An adjusting screw 30 supported by a plate bracket 31, attached to the side plate 10 near the lower end of the right-hand spring 29, forces the lower end of the right-hand plate spring 29 outward, thereby controlling the tension on the right-hand plate spring 29 attached to the pivoted end of the control lever and therefore the pressure applied against the control lever to move it into its lower or normal position shown in FIG. 1, when the solenoid plunger 23 is released by deenergizing the solenoid coil. A pair of nuts threadably fitted to the adjusting screw 30 is provided to retain the adjusting screw in its adjusted position.

Another angularly positioned cantilever plate spring 32 is provided below the control lever 12, as indicated in FIG. 1, one end of the lower plate spring being fixedly attached to the upper plate of an L-shaped bracket 33 attached to the side plate 10. The free end of the lower plate spring 32 has an angularly depending tongue 34 integral therewith, the tongue being so positioned as to readily fit into the space between adjoining teeth of the ratchet wheel 17. As the ratchet wheel is rotated through one tooth space by the angularly downward movement of the control lever, the adjacent tooth of the ratchet wheel engages the tongue 34 at the free end of the lower plate spring 32, thereby elevating the end of the tongue of the plate spring to a level corresponding with the outer circumference of the teeth of the ratchet wheel, and in that manner elevating the free end of the lower plate spring 32.

When the solenoid 24 is energized in a manner hereinafter described, the plunger 23 of the solenoid moves the control lever upward to the angular position shown by dot-dash lines, FIG. 1. When the solenoid plunger 23 is drawn upward, FIG. 1, it moves the plunger 27 of the time delay relay 28 upward with it, thereby compressing the bellows 35 mounted within the time delay relay housing, the action of the bellows controlling the operation of a ball valve 36 mounted at the top of the bellows and seated in a frusto-conical seat attached to the upper end of the bellows, thus controlling the time interval required for actuating the time delay relay.

The time required for releasing the air in the bellows, which is regulated either by selection of the time delay relay, or by the size of the ball valve seat opening in the bellows, or by other type of adjustment, represents the time interval required to operate the stepper switch, or the time interval controlled by the stepper switch.

Figure 12:
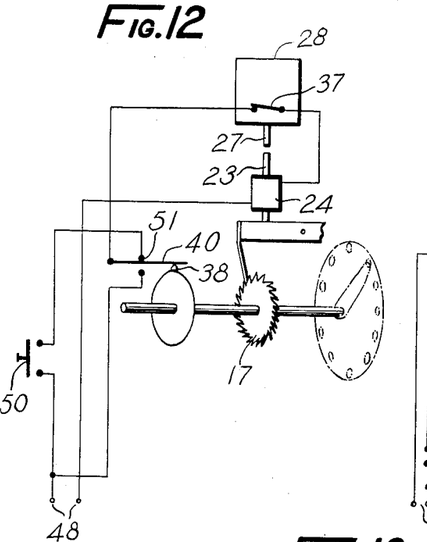
FIG. 12 represents a combination wiring circuit and a schematic diagram of the stepper switch apparatus shown in FIGS. 1 and 2, showing the method of connecting the solenoid and a normally closed switch mounted in the time delay relay, as well as the radially positioned pin actuated switch and the remotely mounted switch connected to one contact thereof.

A normally closed switch 37 is mounted in the housing of the time delay relay, as shown in the wiring diagram, FIG. 12. When the time delay relay plunger 27 is elevated by the upward movement of the solenoid plunger, it opens the normally closed switch 37 in the time delay relay housing, thereby shutting off the flow of current to the solenoid, and allowing the plunger thereof to return to its normal position shown in FIG. 1. When the plunger 27 of the time delay relay is restored to its normal position shown in FIG. 1, by the release of the air from the bellows, the switch 37 in the time delay relay housing is again closed, thereby energizing the solenoid and again elevating the solenoid plunger. This establishes the time interval represented by one step in the operation of the stepper switch. The details of the operation of the electrical apparatus will hereinafter be described in greater detail.

Figure 5:
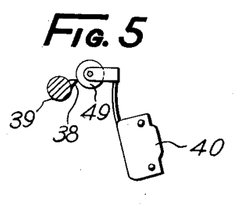
FIG. 5 is a side elevation of the radially positioned actuating pin mounted on the support shaft shown in FIGS. 1 and 2, and the lower snap-action switch and actuator used in conjunction therewith.

As shown in FIGS. 1 and 5, a single radially positioned pin 38 projects angularly beyond the outer circumference of an enlarged section of the control shaft 11 near the side plate 10. In its normal position, the base 39 of the enlarged section of the control shaft 11 from which the pin 38 projects, engages the roller of the actuator of the right end snap-action switch 40 mounted adjacent the inner surface of the side plate 10 and supported by a pair of rods 41 and 42, thereby allowing the current to flow through the snap-action switch 40. When the radial pin 38 of the control shaft engages the roller of the snap-action switch 40, the actuator thereof is lifted to a position at which the snap-action switch is open, thereby establishing a home position, or dead position at one point on each revolution of the control shaft. The detailed significance of this dead or home position in the overall operation of the apparatus will hereinafter be described in greater detail.

Figure 3:
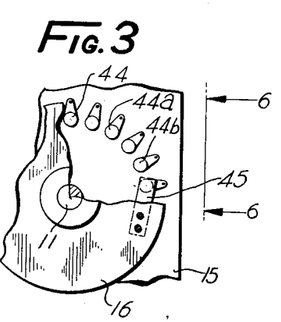
FIG. 3 represent a right-hand side elevation of the commutator panel shown in FIGS. 1 and 2, showing a rotatable contact disc attached to the support shaft on which the ratchet wheel shown in FIG. 1 is mounted, and a series of radially positioned contact buttons mounted adjacent the outer face of the commutator panel, taken on the line 3—3, FIG. 2.

The commutator mechanism shown in FIGS. 2 and 3 is mounted beyond the outer surface of the side plate 10. The commutator mechanism comprises a commutator panel 15 mounted adjacent the outer surface of the side plate and fixedly attached thereto, the commutator panel having a series of equally spaced radially positioned contact buttons 44, 44a, 44b affixed thereto and projecting beyond the outer surface thereof. The number of contact buttons 44 on the commutator panel corresponds to the number of individual switching intervals or steps provided in the apparatus. The method of electrically connecting the contact buttons to each of the corresponding external circuits is controlled by the external circuits with which the stepper switch is connected and therefore has no direct bearing on the stepper switch apparatus as such.

Figure 6:
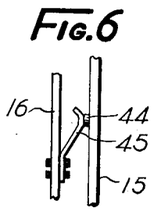
FIG. 6 is a front elevation of one of the contact buttons mounted on the commutator panel and the spring wiper contact attached to the contact disc shown in FIGS. 1 and 3, taken on the line 6—6 of FIGURE 3.

A contact disc 16 is fixedly attached to the right-hand end of the control shaft beyond the commutator panel 15, FIG. 2. As shown in FIGS. 3 and 6, a formed spring wiper contact 45 is attached to the under surface of the contact disc, the spring wiper contact being so located as to progressively engage the individual contact buttons 44, 44a, 44b as the contact disc is rotated. In place of the single commutator and contact disc combination shown in FIGS. 2 and 3 and hereinbefore described, a plurality of commutator and contact disc combinations may be provided to arrange for more contact buttons, and therefore more points from which switching current may be transmitted to an external device.

The operation of each commutator and contact disc combination in a multiple switching unit of this character is substantially the same as the individual commutator unit shown in FIGS. 2 and 3, and hereinbefore described.

FIG. 12 represents a wiring circuit and a schematic diagram of the stepper switch apparatus shown in FIGS. 1, 2 and 3.

In this circuit, the current flows from the source 48 to the coil 24 of the solenoid, which is in turn connected to a normally closed switch 37 mounted inside the time delay relay housing, which automatically shuts off the flow of current to the solenoid coil when the normally closed switch is opened by the upward movement of the time delay relay plunger 27. The control switch 37 mounted in the time delay relay automatically reenergizes the solenoid coil when the switch 37 is again closed by the action of the bellows, thereby determining when the required time interval is completed in a manner hereinafter described in greater detail. The normally closed switch 37 of the time delay relay is connected to the snap-action switch 40 controlled by the radial pin 38 attached to the control shaft, which automatically shuts off the flow of current to the normally closed switch 37 and consequently the solenoid coil 24 when the radially positioned pin 38 attached to an enlarged section of the control shaft engages the roller 49, attached to the actuator of the snap-action switch 40.

A remotely located switch 50 which is manually or automatically operated, is inserted into the line between the current source and one contact 51 of the snap-action switch 40 controlled by the radially positioned pin 38 attached to the control shaft, so that the stepper switch mechanism may be operated at any time when the snap-action switch 40 controlled by the radial pin 38 is in an alternate closed position in engagement with the auxiliary contact 51 of the switch, as shown in FIG. 12. This enables the stepper switch apparatus to be operated even though the snap-action switch 40 controlled by the radial pin 38 is in the open or home position, as shown in FIG. 12.

Due to the connection of the normally closed switch 37 of the time delay relay to the snap-action switch 40 controlled by the radial pin 38 attached to the control shaft, the current will flow to the solenoid coil when the radially positioned pin operated snap-action switch 40 is in the closed position, or any position except the home position in which the radially positioned pin 38 is in engagement with the actuating roller of the snap-action switch, which opens the circuit and establishes the home position of the apparatus, except as hereinafter indicated.

In effect, the closing of the remotely mounted switch 50 actually closes the circuit and starts the operation of the unit after it reaches the stopping or home position represented by the opening of the snap-action switch 40.

If the remotely mounted switch 50 is left open, the operating cycle of the unit continues until it reaches the stopping or home position represented by the opening of the snap-action switch 40.

If the remotely located switch 50 is kept closed, the operating cycle of the unit continues, the cycle being automatically reinitiated after the home position is reached by the opening of the snap-action switch 40 in the manner hereinbefore described.

In a modification of the stepper switch mechanism shown in FIG. 7, an additional left-hand side plate 52, is added, substantially parallel to the right-hand side plate 10 shown in FIG. 2.

In place of the commutator mechanism shown in FIGS. 2 and 3, a control disc support shaft 53, extending between the side plates 10 and 52 and trunnioned therein, is provided to support a plurality of substantially circular control discs 54, 54a, 54b, as shown in FIG. 7.

The two side plates 10 and 52 are supported and held in place by a pair of spacer rods 55 and 55a located between the side plates, substantially perpendicularly thereto, the side plates being clamped to the spacer rods by nuts, or other suitable attaching means.

A pair of auxiliary support rods 57 and 58 is located adjacent the forward edge of the side plates 10 and 52, the auxiliary support rods being angularly positioned in a plane parallel to the plane of the side plates in order to angularly support a row of snap-action switches 59, 59a, and 60, which are supported by the auxiliary support rods 57 and 58, the auxiliary support rods being fitted through openings in the cases containing the snap-action switches, in order to retain the snap-action switches in an angular position relative to a vertical plane of the side plates, as shown in FIGS. 1, 5, 8 and 9.

Figure 8:
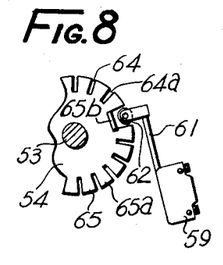
FIG. 8 represents a side elevation of one of the control discs mounted on the support shaft shown in FIG. 7, with a snap-action switch fitted to and operated by the radially positioned control tabs on each of the control discs, taken on line 8——8, FIG. 7.

As shown in FIG. 8, each of the snap-action switches 59, 59a and 60 has an actuator arm 61, 61a pivotally attached thereto, a substantially cylindrical roller 62 being trunnioned on the outer end of each of the snap-action switch actuator arms 61, 61a.

A row of control discs 54, 54a, 54b, shown in FIGS. 7 and 8, is fixedly attached to the support shaft 53. Each of the control discs 54, 54a and 54b is centrally aligned with the cylindrical face of the actuator roller 62 of the mating snap-action switch 59, 59a, 60, as shown in FIG. 8, to enable each of the rollers to follow the outer circumference of the mating control disc when the control discs are rotated by means of the support shaft 53, the number of control discs mounted on the support shaft being determined by the number of switch steps or switching time intervals required in a particular installation.

Figure 15:
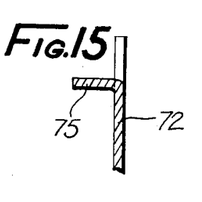

Each of the control discs 54, 54a, 54b has a series of substantially equally-spaced radial slots 64 and 64a cut around the outer circumference thereof, the radial slots dividing the outer circumference of each control disc into a plurality of substantially radial tabs 65, 65a, 65b, which may be located in alignment with the face of the control disc, as shown in FIG. 7, or individually bent over to the position shown in FIGS. 8 and 15, in which each bent over tab 65, 65a, or 65b is substantially perpendicular to the face of the control disc 54, 54a, or 54b.

The total width of each of the bent over tabs 65, 65a, 65b and the adjoining radial slots through each control disc is somewhat greater than the diameter of the snap-action switch actuator roller 62, to enable the snap-action switch actuator roller to drop into the gap between a pair of adjoining aligned tabs in order to actuate the snap-action switch 59, 59a, or 60 and initiate the flow of current therethrough in a manner hereinafter described in greater detail.

This determines the number of tabs 65 which may be located around the outer circumference of each control disc and as the number of tabs around the outer circumference of each control disc determines the number and spacing of the steps or switching intervals, which may be transmitted by each control disc also, controls the diameter and therefore the outer circumference of each control disc.

Thus, in effect, each control disc becomes a separate and distinct controlling element, of a single step or multiple step stepper switch, each control disc and snap-action switch combination constituting the transmitting members of a single or multiple step stepper switch in conjunction with the balance of the apparatus hereinafter described in greater detail.

When the control tabs are in their normal position in alignment with the face of each control disc, the snap-action switch actuator roller 62 is in its outer or open position, and in that manner shuts off the flow of current through the snap-action switch, and cuts out a step or switching interval, in the external circuit to which the unit is attached, in a manner hereinafter described in greater detail.

When the snap-action switch actuator roller drops into one of the gaps between the aligned tabs of the control disc and engages one of the bent over tabs 65, such as that shown in FIG. 15, the snap-action switch actuator roller drops into the gap formed between the two slots 64 and 64a adjoining the bent over tab, thereby allowing the actuator roller and the actuator arm of the switch to drop into the position shown in FIG. 8, thereby initiating the flow of current through the snap-action switch, and therefore the individual stepper switch external circuit comprising the snap-action switch and the adjoining control disc, and in that manner establishing a particular switching step on the externally operated portion of the apparatus which is utilized in conjunction with the balance of the operating mechanism.

In the construction shown in FIG. 8, there are a total of twenty-one tabs around the outer circumference of each of the control discs, although this may be varied considerably depending upon the diameter of the control disc and the diameter of the actuator roller at the outer end of the actuator arm of the snap-action switch, which controls the width of each of the radial tabs 65.

The timing of the rotation of the support shaft 53 on which the control discs 54, 54a, 54b are mounted, is controlled by the actuating mechanism mounted on the right-hand side plate 10, shown in FIG. 7, which is substantially the same as that shown in greater detail in FIG. 1.

Except for the elimination of the commutator mechanism shown in FIGS. 2 and 3, the actuating mechanism shown in FIG. 7, is substantially the same as that shown in FIGS. 1 and 2 and hereinbefore described in detail.

The support shaft 53 which is trunnioned in the two side plates 10 and 52 is considerably longer than that shown in FIGS. 1 and 2.

The control lever 12 and the springs 19 and 29 attached thereto are substantially the same as those shown in FIGS. 1 and 2, the control lever functioning in substantially the same manner.

The ratchet wheel 17 and the ratchet wheel actuating mechanism used in conjunction with the operating mechanism shown in FIG. 7, are substantially the same as those shown in FIGS. 1 and 4.

The solenoid coil 24 and the plunger 23 fitted thereto are substantially the same as those shown in FIGS. 1 and 2, the solenoid coil being energized in the manner shown in the wiring circuit, FIG. 13, and hereinafter described in greater detail.

The time delay relay 28 shown in FIG. 7, and the plunger 27 of the time delay relay 28 are controlled by the solenoid plunger 23 in the same manner as those shown in FIGS. 1 and 2, the timing of each step in the operation of the stepper switch being regulated by the bellows mounted in the time delay relay in substantially the same manner as that hereinbefore described.

The dead or home position in the circuit is established by a radially positioned pin 38 attached to an enlarged section of the support shaft 53 in the manner shown in FIGS. 1 and 5 and hereinbefore described.

Figure 13:
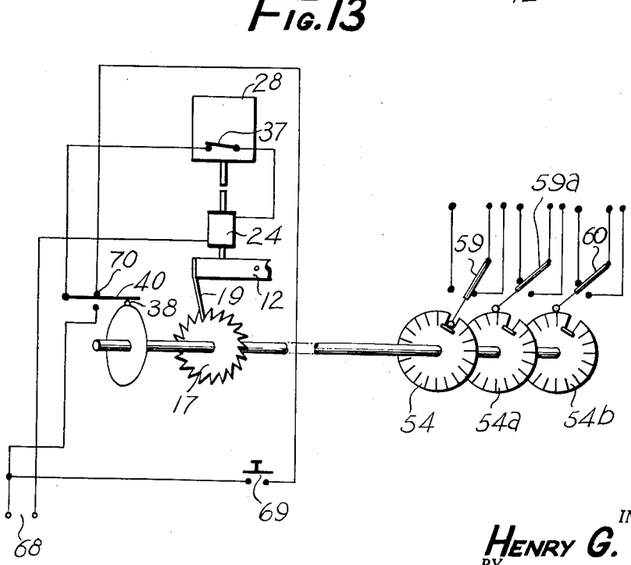
FIG. 13 represents a modification of the combination wiring circuit and schematic diagram of the stepper switch mechanism shown in FIG. 7, showing the method of connecting the solenoid and the normally closed switch mounted in the time delay relay, the radially positioned pin and the snap-action switch actuated thereby, the remotely mounted bypass switch, and the control discs mounted on the support shaft, as well as the snap-action switches controlled by the control discs.

FIG. 13 represents the wiring circuit and a schematic diagram of the modified actuating apparatus of the stepper switch mechanism shown in FIG. 7.

The circuit shown in FIG. 13 is substantially the same as that shown in FIG. 12 and hereinbefore described, except that a series of snap-action switches controlled by the control discs 54, 54a, and 54b is substituted for the commutator mechanism.

The current flows from an A.C. or D.C. source 68 to the coil 24 of the solenoid, which is connected to a normally closed switch 37, mounted in the interior of the case of the time delay relay, which automatically shuts off the flow of current to the solenoid coil when the normally closed switch 37 is opened by the upward movement of the time delay relay plunger in the same manner as that shown in FIG. 12. The switch 37 reenergizes the solenoid coil 24 when the switch 37 is again closed by the action of the bellows in the time delay relay 28, thereby determining when the required time interval established by the bellows of the time delay relay has elapsed in a manner similar to that of the circuit shown in FIG. 12.

The normally closed switch 37 of the time delay relay is connected to the snap-action switch 40 controlled by the radial pin 38 attached to the support shaft, which functions in substantially the same manner as that shown in FIG. 12.

The normally closed switch 37 of the time delay relay can therefore be utilized to control the flow of current to the solenoid coil at any point in the rotation of the support shaft, except the point at which the radially positioned pin 38 attached to the support shaft engages the actuator roller 62 of the snap-action switch 40, which establishes the dead or home position of the circuit in the same manner as that shown in FIG. 12.

A remotely located switch 69 is inserted into the line between the current source and one contact 70 of the snap-action switch 40 controlled by the radially positioned pin attached to the support shaft, in the same manner as that shown in FIG. 12, so that the stepper switch mechanism may be operated at any time when the snap-action switch 40 is in its alternate closed position, in engagement with the contact 70 as shown in FIG. 13.

In effect, the remotely located switch 69 actually closes the circuit and starts the operation of the unit after the dead or home position is reached by the opening of the snap-action switch 40 in the same manner as that shown in FIG. 12.

If the remotely mounted switch 69 is left open, the operating cycle continues until the unit reaches its dead or home position represented by the opening of the snap-action switch 40.

If the remotely located switch 69 is kept closed, the operating cycle of the unit continues in the same manner as that shown in the circuit shown in FIG. 12.

In another modification of the operating mechanism shown in FIGS. 10 and 11 which functions as a timer, the two side plates 52 and 71, are substantially the same as those shown in FIG. 7, the side plates rotatably supporting a control disc support shaft 53, the shaft in turn supporting a plurality of circular control discs 54, 54a, and 54b in the same manner as that shown in FIG. 7.

The auxiliary support rods 57 and 58, shown in FIG. 11, are substantially the same as those shown in FIG. 7, the auxiliary support rods angularly supporting a row of snap-action switches 59, in the same relative positions as those shown in FIGS. 7 and 8.

The actuator arm and the actuator roller of the snap-action switches are substantially the same as those shown in FIG. 8.

The control discs 54, 54a, mounted on the support shaft 53 are substantially the same as those shown in FIGS. 7 and 8, the control discs functioning in substantially the same manner in closing the circuit through the individual snap-action switches 59.

The right end control disc 72 shown in FIG. 11, is a zeroing disc which engages a snap-action switch, both of which operate in substantially the following manner:

The right end control disc 72 mounted on the support shaft 53 near the right-hand side plate 71 is a zeroing disc, which functions in a manner similar to the radially positioned pin 38 in conjunction with a second time delay relay, which will hereinafter be described in greater detail. The diameter of the zeroing control disc 72 is substantially the same as that of the control discs 54, the zeroing disc being mounted adjacent the right-hand end of the support shaft 53 in substantial alignment with the actuating roller 62 of the snap-action switch 73, mounted at the right-hand end of the row snap-action switches in FIG. 11.

Figure 9:
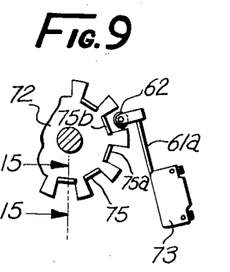
FIG. 9 is a side elevation of the right-hand end, or zeroing control disc mounted on the right-hand end of the support shaft shown in FIGURE 11, showing a plurality of the radially positioned tabs of the zeroing control disc bent over into a position substantially perpendicular to the zeroing control disc, and a snap-action switch and actuator roller used in conjunction with the zeroing control disc, taken on the line 9—9, FIG. 11.

The zeroing control disc has a series of substantially equally spaced radial slots around the outer circumference thereof, the slots dividing the outer circumference of the zeroing disc into a plurality of substantially radial tabs 75, 75a, and 75b, as shown in FIG. 9, the tabs being normally located in alignment with the face of the zeroing disc, or they may be bent over into a position substantially perpendicular to the face of the disc as shown in FIGS. 9 and 15. In the construction shown in FIG. 9, there are a total of twenty-one tabs around the outer circumference of the zeroing disc, although this may be varied considerably as hereinafter described.

The number of radial tabs 75 of the zeroing disc bent over in to the position shown in FIG. 15 is equal to the number of timing intervals or timing circuits represented by the control discs 54, 54a, on which timing intervals are to be established at each revolution of the zeroing disc 72. The zeroing disc 72 is so constructed that if all of the tabs 75, 75a, 75b are in the flat position in alignment with the surface of the disc 72, the snap action switch 73 remains in its operative position, thereby enabling the time delay relays 76 and 77 to function in the manner herein described, and enabling each of the control discs 54, 54a, 54b to establish a particular switching step in the external circuit as herein described.

The timing of the rotation of the support shaft on which the control discs and the zeroing disc are mounted, is controlled in substantially the same manner as that shown in FIGS. 1 and 7, except that a pair of time delay relays 76 and 77 is substituted in place of the individual time delay relay 28 shown in FIGS. 1 and 7.

The support shaft 53 on which the control discs are mounted is substantially the same as that shown in FIG. 7.

The control lever 12 and the plate springs attached to the ends thereof are substantially the same as those shown in FIGS. 1 and 2, the ratchet tip 20 attached to the left-hand plate spring controlling the rotation of the ratchet wheel 17 in substantially the same manner. The auxiliary lower plate spring 32 and the tongue 34 integral therewith, which engages the teeth of the ratchet wheel are also substantially the same as those shown in FIG. 1.

The solenoid coil 24 is substantially the same as that shown in FIG. 1, except that the solenoid coil 24 has a reciprocating plunger 78 having a wide head 79 attached thereto, the hub of which is attached to the upper end of the solenoid plunger, the sides of the head extending outward so that they engage the lower end of a pair of plungers 80 and 81 reciprocatingly fitted to the two time delay relays 76 and 77, which are attached to the right-hand side plate 71 in the relative positions shown in FIG. 10.

When the solenoid coil 24 is energized in the manner hereinafter described, the solenoid plunger 78 with the head 79 attached thereto is elevated, the plunger head raising the two plungers 80 and 81 fitted to the two time delay relays 76 and 77, and compressing the bellows 35 mounted within each time delay relay housing. The action of each of the bellows 35 controls the operation of a ball valve 36 mounted above each of the bellows and seated in a frusto-conical seat attached to the upper end of each of the bellows in the same manner as the individual time delay relay shown in FIG. 1, and hereinbefore described.

The size, contour or thickness of the bellows mounted in each of the time delay relays, or the valve seat opening therethrough may be varied in such a manner as to obtain a different delay time for each of the time delay relays 76 and 77, thus varying the time lag required to reinitiate the flow of current to the solenoid after it is shut off by one of the normally closed switches 82 and 83, one of which is mounted in each of the time delay relays, in a manner hereinafter described in conjunction with the wiring circuit shown in FIG. 14, the opening of the normally closed switches 82 and 83 in both time delay relays, when the plungers 80 and 81 are elevated, thereby shutting off the flow of current to the solenoid coil 24 and allowing the solenoid plunger to return to its normal position shown in FIG. 10.

The time required for releasing the air from each of the bellows 35, which is controlled by the construction of the bellows and the size of the valve opening therein, represents the selected time internal for operating the timer. As the timing of the two bellows and the adjustment thereof is varied to the extent required for each installation, the use of two time delay relays provides in effect two separate and distinct timer controls, the time intervals represented by each of which is substantially independent of the other.

Figure 14:
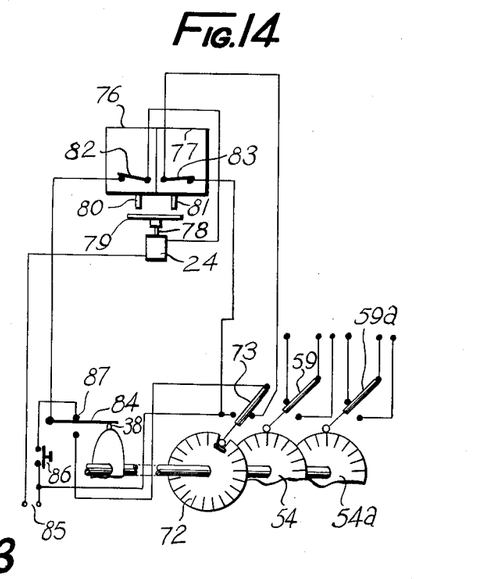
FIG. 14 represents a combination wiring circuit and schematic diagram of the timer apparatus shown in FIGS. 10 and 11, showing the two time delay relays controlled by a single solenoid plunger, also the method of connecting the normally closed switch in the respective time delay relay to the solenoid and the radial pin operated switch respectively, also the remotely mounted bypass switch, the zeroing control disc mounted on the support shaft and the snap-action switch actuated thereby, and the series of individual control discs mounted on the support shaft and the individual snap-action switches fitted thereto.

While the solenoid plunger elevates both plungers 80 and 81 of the time delay relays simultaneously, the normally closed timing switches 82 and 83 individually fitted to the time delay relays and separately connected to either the snap-action switch 84 actuated by the radially positioned pin 38 attached to the support shaft, or the snap-action switch 73 actuated by the zeroing disc 72, mounted on the support shaft 53, in the manner shown in the wiring diagram shown in FIG. 14, only one of the bellows 35, mounted in one of the time delay relays 76 and 77 reinitiates the flow of current to the solenoid coil after it has been shut off by one or both of the normally closed switches 82, 83, respectively mounted in the time delay relays, thereby establishing the specific time interval required. As the time interval of the two sets of bellows varies, only the time delay relay 76 or 77, the normally closed timing switch 82 or 83 of which is connected to the energized snap-action switch 84 which is controlled by the radially positioned pin 38, or the snap-action switch 73 controlled by the zeroing disc 72 mounted on the support shaft 53, controls the reinitiating of the current to the solenoid coil after the selected normally closed switch 82 or 83 mounted in the time delay relays 76 and 77 has been closed by the action of the corresponding bellows 35, and therefore the establishment of the selected time interval of the timer. In that manner the selected time intervals of each time delay relay used in conjunction with the apparatus may be regulated by the selected time delay relay 76 or 77 in the manner shown in the wiring diagram shown in FIG. 14 and hereinafter described in greater detail.

The dead or home position in the wiring circuit shown in FIG. 14 is established by a radially positioned pin 38 attached to an enlarged section of the support shaft 53 in a manner similar to that shown in FIGS. 1 and 5 and hereinbefore described.

In this construction, the radial pin is pressed against the actuating roller of a snap-action switch 84 which functions in substantially the same manner as snap-action switch 40 shown in FIGS. 1 and 12.

FIG. 14 shows the wiring circuit and schematic operating diagram of the modified actuating apparatus of the timer unit shown in FIGS. 10 and 11.

The circuit shown in FIG. 14 is substantially the same as that shown in FIG. 13, except for the substitution of the two normally closed timing switches 82 and 83 in the two time delay relays 76 and 77, in place of the single normally closed switch shown in FIG. 13.

As shown in FIG. 14, one of the timing switches 82, which is mounted in the time delay relay 76, having the shortest time interval is connected to the snap-action switch 84 which is actuated by a radially positioned pin 38 attached to the support shaft 53, thus enabling the pin operated snap-action switch 84 to establish a dead or home position for the one time delay relay 76 having the shortest time interval. When the disc 72 is in the position shown in FIG. 14, with the actuator roller of the switch 73 in one of the slots between the tabs surrounding the disc, the switch engages the right-hand contact of the switch in substantially the same manner as that shown in FIG. 13. In this position, a long time interval, controlled by the right-hand relay 83, would be established. When the actuator roller of the switch 73 is elevated by the tabs at the outer circumference of the disc 72, the switch is moved into engagement with the left-hand contact shown in FIG. 14. With the radially positioned pin 38, in the position shown in FIG. 14, current flows from the left-hand contact to the switch 82, of the left-hand relay 76.

This provides a short time interval controlled by the left-hand relay 76.

The current flows from an A.C. or D.C. source 85 to the coil 24 of the solenoid, which is connected to the normally closed timing switch 82 mounted in the interior of the time delay relay 76, the time delay relay 76 having the shortest time interval, the normally closed timing switch 82 automatically shutting off the flow of current to the solenoid coil 24 when the plunger 78 of the solenoid simultaneously elevates the two plungers 80 and 81 of the two time delays 76 and 77, thereby opening the normally closed timing switch 82 of the time delay relay 76 and allowing the plunger 78 of the solenoid to be restored to its normal position shown in FIG. 10.

In that manner the selected timing switch 82 mounted in the relay 76 can be actuated at any angular position in the rotation of the support shaft, except the angular position at which the radially positioned pin 38 attached to the support shaft engages the actuator roller 62 of the mating snap-action switch 84 which establishes a dead or home position of the circuit in the manner hereinbefore described.

A remotely located switch 86 is inserted into the line between the current source and one contact of the snap-action switch 84 controlled by the angularly positioned pin 38, so that the timer mechanism may be operated during the period when the snap-action switch 84 controlled by the radially positioned pin is in an alternately closed position, in engagement with the auxiliary contact 87 of the snap-action switch, which is normally the home position of the circuit. This enables the timer unit to be operated even though the snap-action switch 84 is in its dead or home position, under the above circumstances.

The closing of the remotely located switch 86 closes the circuit and starts the operation of the unit after it reaches the dead or home position in the same manner as that shown in FIGS. 12 and 13.

If the remotely located switch is left open, the operating cycle of the unit continues until it reaches the dead or home position, represented by the opening of the snap-action switch 84.

If the remotely located switch 86 is kept closed, the operating cycle of the unit continues, the cycle being automatically reinitiated after the snap-action switch 84 is opened in the same manner as that shown in FIGS. 12 and 13.

In the circuit shown in FIG. 14, the selection of the time delay relay 76 or 77, which is to be used for establishing a specific time interval or cycle, is definitely determined only after the solenoid plunger 78 is released by opening the normally closed snap-action switch 82 which is mounted in the time delay relay 76 having the shortest time interval.

If the time delay relay 77 having the longer time interval is to be used, the normally closed timer switch 83 mounted in the time delay relay 77 is opened when the solenoid plunger 78 moves upward, thereby opening both timer switches 82 and 83 by elevating the time delay relay plungers 80 and 81. The timer switch 83 remains open until the action of the bellows 35 mounted in the time delay relay 77 again closes it, thereby reinitiating the flow of current to the solenoid 24 and establishing a long time interval, the exact duration of which is determined by the adjustment of the bellows, within that time delay relay.

Where the longer interval time delay relay is to be used, the timing switch 83 in the time delay relay 77 remains open until it is closed by the action of the bellows mounted therein, which determines the end of the time interval of that relay.

The angular movement of the support shaft on each downstroke of the time delay relay plunger 80 or 81 is limited to the angular movement represented by the angle subtended by the spacing of one pair of ratchet teeth 17a in the ratchet wheel 17.

When the solenoid 24 is energized, the plunger 78 thereof moves the plungers 80, 81 of both time delay relays 76, 77 upward simultaneously, thereby opening the normally closed switches 82, 83 in both time delay relays.

The individual bellows in the two time delay relays determines the time interval controlled by each relay.

The selection of the time delay relay 76, 77 for determining a long or short time interval is determined by the method of connecting the disc-controlled snap action switch, to the switches 82, 83 in the time delay relays.

The time interval represented by the timing of the bellows in the short time interval relay 76 must be greater than the time required for the solenoid plunger 78 to return by gravity to its initial position, after the timer switch 82 in the time delay relay 76 is opened, otherwise the timer switch 82 would be closed and the solenoid reenergized before the ratchet wheel 17 on the support shaft 53 completes the angular movement represented by one tooth space, as the angular movement of the support shaft is controlled only by the downward movement of the control lever 12, and is therefore not completed until the solenoid plunger 78 reaches the bottom of its stroke, thereby enabling the ratchet tip 20 attached to the lower end of the plate spring 19 to move the ratchet wheel and the support shaft through one complete tooth space.

In order to provide for a relatively short time interval in one of the time delay relays 76 or 77, the diameter of the ratchet wheel may be increased, and a relatively large number of teeth formed thereon, thereby reducing the tooth spacing and the angle represented by one tooth space to a minimum.

It will be apparent to those skilled in the art that my present invention is not limited to the specific details described above and shown in the drawings, and that various modifications are possible in carrying out the features of the invention and the operation, actuation, and the method of connection, installation and utilization thereof, without departing from the spirit and scope of the appended claims.

What I claim is:

1. A switching mechanism comprising an electrically energized solenoid coil having a reciprocating plunger fitted thereto, multiple time delay relays mounted adjacent the solenoid coil, said multiple delay relays having a plurality of reciprocating plungers fitted thereto, substantially parallel to and in operative alignment with the solenoid plunger, means attached to the solenoid plunger adapted to simultaneously engage the multiple plungers of the time delay relays, means mounted in said multiple time delay relays adapted to selectively determine the timing sequence of the operation of the solenoid, and means controlled by the movement of the solenoid plunger in one direction operative to transmit the timing intervals established by the multiple time delay relays to a remotely located apparatus.

2. A switching mechanism as in claim 1, in which the transmission means controlled by the reciprocating plunger of the solenoid includes a rotatably mounted support shaft, a ratchet member mounted on said support shaft operative to angularly move the support shaft about its axis of rotation, means controlled by the longitudinal movement of the solenoid plunger in one direction operative to engage the ratchet member to rotate it through progressive angular increments, and means mounted adjacent and controlled by said support shaft, operative to selectively transmit to an externally located apparatus the selective current flow timing steps established by the multiple time delay relays in the solenoid.

3. A switching mechanism as in claim 1, in which the transmission means controlled by the solenoid plunger includes a rotatably mounted support shaft, a ratchet member mounted on said support shaft operative to angularly move the support shaft about its axis of rotation, means controlled by the longitudinal movement of the solenoid plunger in one direction operative to engage the ratchet member to progressively rotate it through uniform angular increments, means attached to the support shaft operative to shut off the flow of current to the solenoid coil at a predetermined angular position in the rotation of the support shaft, and means mounted adjacent said support shaft and controlled thereby operative to transmit to an externally mounted apparatus the selective current flow timing steps established by the multiple time delay relays in the solenoid.

4. A switching mechanism as in claim 1, in which the energizing of the solenoid coil is operative to move the reciprocating plunger in one direction, the multiple time delay apparatus being a pair of time delay relays, the plungers of both time delay relays being controlled by the plunger of the solenoid in one direction, means mounted in each of said time delay relays operative to establish a predetermined selected time interval in the energizing of the solenoid coil, and means mounted in each of said time delay relays operative to selectively initiate the flow of current to the solenoid coil when the established selected time interval has been completed.

5. A switching mechanism as in claim 1, in which the energizing of the solenoid coil is operative to move the reciprocating plunger fitted to the solenoid coil in one direction, the multiple time delay relays being a pair of time delay relays, the solenoid plunger having means attached thereto adapted to simultaneously engage the reciprocating plungers of both time delay relays to move the plungers of both time delay relays in one direction simultaneously, switching means mounted in each of said time delay relays operative to shut off the flow of current to the solenoid coil when the selected time delay relay plunger is moved through a predetermined distance toward the time delay relays, means mounted in each of said time delays relays operative to engage the switching means mounted in the selected time delay relay to reinitiate the flow of current to the solenoid coil when the established selected time interval has been completed.

6. A switching mechanism as in claim 1, in which the energizing of the solenoid coil is operative to move the reciprocating plunger fitted to the solenoid coil in one direction, the multiple time delay relays being a pair of time delay relays, the solenoid plunger having means attached thereto adapted to simultaneously engage the reciprocating plungers of both time delay relays, to move the plungers of both time delay relays in one direction, switching means mounted in each of the time delay relays operative to shut off the flow of current to the solenoid coil when the plunger of the selected time delay relay is moved through a predetermined distance toward the time delay relays, means mounted in each of said time delay relays operative to engage the switching means mounted in the selected time delay relay to reinitiate the flow of current to the solenoid coil when the selected established time interval has been completed, the transmission means controlled by the plunger of the solenoid including a rotatably mounted support shaft, a ratchet member mounted on said support shaft operative to angularly move the support shaft about its axis of rotation, means controlled by the solenoid plunger operative to engage the ratchet member to rotate it through uniform angular increments co-ordinated with the longitudinal movement of the solenoid plunger in one direction, a switch control member attached to the support shaft, and a switch operative to engage said switch control member, said switch being operative to shut off the flow of current to the solenoid coil when the switch control member reaches a predetermined angular position in the rotation of the support shaft.

7. A stepper switching apparatus comprising an electrically energized solenoid coil having a plunger reciprocatingly fitted thereto, a time delay relay mounted adjacent the solenoid coil, said time delay relay having a plunger reciprocatingly fitted thereto in operative alignment with the solenoid plunger, means mounted in said time delay relay operative to establish a time interval for controlling the energizing of the solenoid, a rotatably mounted support shaft, a ratchet member fixedly attached to the support shaft co-axially therewith, a pivoted control lever mounted between the solenoid plunger and the ratchet member, means pivotally connecting the solenoid plunger to the pivoted control lever, a spring-actuated toothed member attached to one end of the pivoted control lever adapted to engage the ratchet member to progressively angularly move the ratchet member through predetermined angular increments co-ordinated with the longitudinal movement of the solenoid plunger in one direction, a radially positioned pin mounted adjacent the support shaft, a switch actuating member being in operative alignment with the pin, the switch actuating member being in operative alignment with the pin, the switch being operative to shut off the flow of current to the solenoid coil when the actuating member of the switch engages the radially positioned pin at the predetermined angular position of the support shaft, a plurality of control discs mounted on the support shaft, concentrically therewith, each of said control discs having a plurality of equally-spaced radially positioned tabs around the outer circumference thereof, the tabs being adapted to be individually selectively bent into a position substantially perpendicular to the control disc to establish a gap between the adjacent pair of tabs, a switching member mounted adjacent each of said control discs, each of said switching members having means pivotally attached thereto, in operative alignment with the outer circumference of each of the control discs, a portion of said pivoted means being adapted to selectively fit into the gaps between pairs of tabs on the adjacent control disc to transmit to an externally mounted apparatus the switching steps established by the solenoid coil and time delay relay combination, and transmit the timing steps established by the time delay relay to a remotely located apparatus.

8. A multiple interval timer apparatus comprising an electrically energized solenoid coil having a reciprocating plunger fitted thereto, a pair of time delay relays mounted adjacent the solenoid coil, each of said time delay relays having a reciprocating plunger fitted thereto, substantially parallel to and in operative alignment with the solenoid plunger, means attached to the solenoid plunger operative to simultaneously engage the reciprocating plungers of both time delay relays, means mounted in each of said time delay relays operative to selectively determine the timing sequence of the operation of the solenoid, and means controlled by the longitudinal movement of the solenoid plunger in one direction operative to transmit the timing intervals selectively established by one of the time delay relays to a remotely located apparatus.

9. A multiple interval timing apparatus comprising an electrically energized solenoid coil having a plunger reciprocatingly fitted thereto, a pair of time delay relays mounted adjacent the solenoid coil, each of said time delay relays having a reciprocating plunger fitted thereto, the reciprocating plungers being substantially parallel to and in operative alignment with the solenoid plunger, means attached to the solenoid plunger operative to simultaneously engage the reciprocating plungers of both time delay relays, means mounted in each of the said time delay relays operative to selectively establish a time interval for controlling the energizing of the solenoid, and means controlled by the solenoid plunger operative to convert the reciprocating movement of the solenoid to rotational movement, and transmit the time interval selectively established by the time delay relays to a remotely located apparatus.

10. A multiple interval timer apparatus as in claim 9, in which the energizing of the solenoid coil is operative to move the reciprocating plunger thereof in one direction, the solenoid plunger being operative to simultaneously move the time delay relay plungers toward the time delay relays when the solenoid coil is energized, a normally closed control switch mounted in each time delay relay operative to selectively shut off the flow of current to the solenoid coil when the plunger in the selected time delay relay is moved through a predetermined distance toward the time delay relay, the time interval establishing means in the selected time delay relay being operative to engage the control switch mounted therein to reinitiate the flow of current to the solenoid coil when the selectively established time interval has been completed, thus establishing a specific time interval in the operation of the timer apparatus, the means operative to convert the reciprocating movement of the solenoid plunger to rotational movement including a rotatably mounted support shaft, a ratchet member fixedly attached to the support shaft co-axially therewith, a pivoted control lever mounted between the solenoid plunger and the ratchet member, means pivotally connecting the solenoid plunger to the pivoted control lever, a spring supported toothed member attached to one end of the pivoted control lever operative to engage the ratchet member to progressively angularly move the ratchet member through predetermined angular increments co-ordinated with the longitudinal movement of the solenoid plunger in one direction, a switch control member attached to the support shaft at a predetermined angular position thereof, a switch having an actuating member controllable by the switch control member of the support shaft attached thereto, mounted adjacent the support shaft, the switch actuating member being in operative alignment with the switch control member of the support shaft, the switch being operative to shut off the flow of current to the selected time delay relay and the solenoid coil when the actuating member of the switch engages the control member of the support shaft at a predetermined angular position of the support shaft, a manually controllable remotely located switch operative to reinitiate the flow of current to the solenoid after it is shut off by the support shaft control member actuated switch connected to the support shaft control member actuated switch, and means mounted on the support shaft operative to transmit to an externally mounted apparatus the timing intervals established by the solenoid and the selected time delay relay combination.

11. A multiple interval timer apparatus as in claim 9, in which the energizing of the solenoid is operative to move the reciprocating plunger thereof in one direction, the solenoid plunger being operative to simultaneously move the time delay relay plungers toward the respective relays when the solenoid coil is energized, a normally closed control switch mounted in each time delay relay operative to selectively shut off the flow of current to the solenoid when the plunger in the selected time delay relay is moved through a predetermined distance toward the relay, the time interval establishing means in the selected time delay relay being operative to engage the control switch mounted therein to reinitiate the flow of current to the solenoid when the selectively established time interval has been completed, thereby establishing a specific time interval in the operation of the timer apparatus, the means for converting the reciprocating movement of the solenoid plunger to rotational movement including a rotatably mounted support shaft, means fixedly attached to the support shaft operative to progressively angularly move the support shaft through predetermined angular increments, co-ordinated with the longitudinal movement of the solenoid plunger in one direction, a plurality of control discs mounted on the support shaft concentrically therewith, each of said control discs having a plurality of radially positioned selective switching member control sections integral therewith, a switching member mounted adjacent each of said control discs in operative alignment therewith, means attached to each of said switching members operative to engage the switching member control sections of the adjacent control disc to energize the switching member, said switching members being operative to transmit to an externally mounted apparatus the selected time intervals established by the solenoid and one time delay relay combination, and an individual control disc mounted on the support shaft substantially parallel to the control discs, said individual control disc having a plurality of radially positioned switching member control sections integral therewith, a switching device mounted adjacent said individual control disc in operative alignment therewith, actuating means attached to said switching device operative to engage the switching control sections of the individual control disc to actuate the switching device, said switching device being operative to coact with the normally closed switch in one of the time delay relays to shut off the flow of current to the solenoid.

12. A multiple interval timer apparatus as in claim 9, in which the energizing of the solenoid is operative to move the reciprocating plunger thereof toward the time delay relays, the solenoid plunger being operative to simultaneously move the time delay relay plungers toward the respective relays when the solenoid coil is energized, a normally closed control switch mounted in each time delay relay operative to selectively shut off the flow of current to the solenoid when the plunger in the selected time delay relay is moved through a predetermined distance toward the relay, the time interval establishing means in the selected time delay relay being operative to engage the control switch mounted therein to reinitiate the flow of current to the solenoid coil when the selectively established time interval has been completed, thereby establishing a specific time interval in the operation of the timer apparatus, the means operative to convert the reciprocating movement of the solenoid plunger to rotational movement including a rotatably mounted support shaft, a ratchet wheel fixedly attached to the support shaft co-axially therewith, a pivoted control lever mounted between the solenoid and the ratchet wheel, means pivotally connecting the solenoid plunger to the pivoted control lever, a spring supported ratchet tooth member attached to one end of the pivoted control lever operative to engage the ratchet wheel to progressively angularly move the ratchet wheel through predetermined angular increments coordinated with the longitudinal movement of the solenoid plunger in one direction, a plurality of control discs mounted on the support shaft concentrically therewith, each of said control discs having a plurality of radially positioned selective switching member control sections integral therewith, a switching member mounted adjacent each of said control discs in operative alignment therewith, means attached to each of said switching members operative to engage the switching member control section of the adjacent control disc to energize the switching member, said switching members being operative to transmit to an externally mounted apparatus the selected time intervals established by the solenoid and the selected time delay relay combination, a radially positioned pin fixedly attached to the support shaft, a switch having an actuator member attached thereto controllable by the radially positioned pin mounted adjacent the support shaft, the switch actuator member being in operative alignment with the pin, the switch being operative to shut off the flow of current to the solenoid coil when the actuator member of the switch engages the radially positioned pin at a predetermined angular position of the support shaft, and a manually controllable remotely located switching member operative to reinitiate the flow of current to the solenoid coil after it is shut off by the pin controlled switch, connected to the pin controlled switch.

13. A multiple interval timer apparatus as in claim 9, in which the energizing of the solenoid coil is operative to move the reciprocating plunger thereof toward the time delay relays, the solenoid plunger being operative to simultaneously move the time delay relay plungers toward the respective relays when the solenoid coil is energized, a normally closed control switch mounted in each time delay relay operative to selectively shut off the flow of current to the solenoid coil when the plunger in the first time delay relay is moved through a predetermined distance toward the relay, the time interval establishing means in the second time delay relay being operative to engage the control switch mounted therein to reinitiate the flow of current to the solenoid coil when the time interval established thereby has been completed, thus establishing a specific time interval in the operation of the timer apparatus, the means operative to convert the reciprocating movement of the solenoid plunger to rotational movement including a rotatably mounted support shaft, a ratchet member fixedly attached to the support shaft co-axially therewith, a pivoted control lever mounted between the solenoid plunger and the ratchet member, means pivotally connecting the solenoid plunger to the pivoted control lever, a spring supported toothed member attached to one end of the pivoted control lever operative to engage the ratchet member to progressively move the ratchet member through predetermined angular increments co-ordinated with the longitudinal movement of the solenoid plunger in a direction opposite the time delay relays, a plurality of control discs mounted on the support shaft concentrically therewith, each of said control discs having a plurality of radially positioned selective switching member control sections integral therewith, a switching member mounted adjacent each of said control discs in operative alignment therewith, means attached to each of said switching members operative to engage the switching member control section of the adjacent control disc to energize the switching member, said switching members being operative to transmit to an externally mounted apparatus the selected time interval established by the solenoid and the second time delay relay combination, a switch control member attached to the support shaft at a predetermined angular position thereof, a switch having an actuating member controllable by the switch control member of the support shaft attached thereto, mounted adjacent the support shaft, the switch actuating member being in operative alignment with the switch control member attached to the support shaft, the switch being operative to shut off the flow of current to the first time delay relay and the solenoid coil when the actuating member of the switch engages the control member of the support shaft at a predetermined angular position of the support shaft, an individual control disc mounted on the support shaft substantially parallel to the control discs, said individual control disc having a plurality of radially positioned switching control sections integral therewith, a switching device mounted adjacent said individual control disc in operative alignment therewith, and means attached to said switching device operative to engage the switching control sections of the individual control disc to actuate the switching device, said switching device being operative to coact with the normally closed switch in one of the time delay relays to shut off the flow of current to the solenoid.

14. A stepper switching apparatus comprising an electrically energized solenoid coil having a plunger reciprocatingly fitted thereto, a time delay relay mounted adjacent the solenoid coil, said time delay relay having a plunger reciprocatingly fitted thereto in operative alignment with the solenoid plunger, means mounted in said time delay relay operative to establish a time interval for controlling the energizing of the solenoid, a rotatably mounted support shaft mounted substantially perpendicularly to the axis of the solenoid plunger, a ratchet member fixedly attached to the support shaft co-axially therewith, a pivoted control lever mounted between the solenoid plunger and the ratchet member, means pivotally connecting the solenoid plunger to the pivoted control lever, a spring actuated toothed member attached to one end of the pivoted control lever operative to engage the ratchet member through predetermined angular increments co-ordinated with the longitudinal movement of the solenoid plunger in one direction, a switch control member fixedly attached to the support shaft at a predetermined angular position thereof, a switch having an actuating member controllable by the switch control member attached to the support shaft, attached thereto, mounted adjacent the support shaft, the switch actuating member being in operative alignment with the switch control member attached to the support shaft, the switch being operative to shut off the flow of current to the time delay relay and the solenoid coil when the actuating member of the switch engages the control member attached to the support shaft, at the predetermined angular position of the support shaft, a plurality of control discs mounted on the support shaft concentrically therewith, each of said control discs having a plurality of equally-spaced radially positioned tabs around the outer circumference thereof, the tabs being operative to be individually selectively bent into a position substantially perpendicular to the control disc to establish a gap between each pair of tabs, a switching member mounted adjacent each of said control discs, each of said switching members having an actuator arm attached thereto, the actuator arm having a rotatably supported control means attached to one end thereof in operative alignment with the outer circumference of the adjacent control disc, the control means of each of said switching members being operative to selectively fit into the gaps between pairs of tabs on the adjacent control disc to transmit to an externally mounted apparatus the switching steps established by the solenoid coil and time delay relay combination.

15. A stepper switching apparatus comprising an electrically energized solenoid coil having a plunger reciprocatingly fitted thereto, a time delay relay mounted adjacent the solenoid coil, said time delay relay having a plunger reciprocatingly fitted thereto in operative alignment with the solenoid plunger, means mounted in said time delay relay operative to establish a time interval for controlling the energizing of the solenoid, a rotatably mounted support shaft mounted substantially perpendicularly to the axis of the solenoid plunger, a ratchet member fixedly attached to the support shaft co-axially therewith, a pivoted control lever mounted between the solenoid plunger and the ratchet member, means pivotally connecting the solenoid plunger to the pivoted control lever, a spring actuated toothed member attached to one end of the pivoted control lever operative to engage the ratchet member to progressively angularly move the ratchet member through predetermined angular increments co-ordinated with the longitudinal movement of the solenoid plunger in one direction, a radially positioned pin fixedly attached to the support shaft, a switch having an actuating member attached thereto controllable by the radially positioned pin mounted adjacent the support shaft, the switch actuating member being in operative alignment with the radially positioned pin, the switch being operative to shut off the flow of current to the solenoid coil when the actuating member of the switch engages the radially positioned pin at the predetermined angular position of the support shaft, a plurality of control discs mounted on the support shaft concentrically therewith, each of said control discs having a plurality of equally spaced radially positioned tabs around the outer circumference thereof, the tabs being operative to be individually selectively bent into a position substantially perpendicular to the control disc to establish a gap between each pair of tabs, a switching member mounted adjacent each of said control discs in operative alignment therewith, means attached to each of said switching members operative to selectively fit into the gaps between pairs of tabs on the adjacent control disc to energize the switching member, said switching members being operative to transmit to an externally mounted apparatus the switching steps established by the solenoid and time delay relay combination.

16. A stepper switching apparatus comprising an electrically energized solenoid coil having a plunger reciprocatingly fitted thereto, a time delay relay mounted adjacent the solenoid coil, said time delay relay having a plunger reciprocatingly fitted thereto in operative alignment with the solenoid plunger, means mounted in said time delay relay operative to establish a time interval for controlling the energizing of the solenoid coil the energizing of the solenoid coil being operative to move the reciprocating plunger thereof in one direction, the reciprocating plunger of the time delay relay being located in substantially axial alignment with the plunger of the solenoid, the solenoid plunger being operative to move the time delay relay plunger toward the relay when the solenoid coil is energized, a normally closed control switch mounted in the time delay relay operative to shut off the flow of current to the solenoid coil when the time delay relay plunger is moved through a predetermined distance toward the time delay relay, the time interval establishing means in the time delay relay being operative to engage the control switch mounted therein to reinitiate the flow of current to the solenoid coil when the established time interval has been completed, thus establishing a specific step in the operation of the stepper switching apparatus, the means for converting the reciprocating movement of the solenoid plunger to rotational movement including a rotatably mounted support shaft, a ratchet member fixedly attached to the support shaft co-axially therewith, a pivoted control lever mounted between the solenoid plunger and the ratchet member, means pivotally connecting the solenoid plunger to the control lever, a spring-supported toothed member attached to one end of the control lever operative to engage the ratchet member to progressively angularly move the ratchet member through predetermined angular increments, coordinated with the longitudinal movement of the solenoid plunger, in one direction, a radially positioned pin fixedly attached to the support shaft, a switch having an actuating member attached thereto controllable by the radially positioned pin mounted adjacent the support shaft, the switch actuating member being in operative alignment with the pin, the switch being operative to shut off the flow of current to the solenoid coil when the actuating member of the switch engages the radially positioned pin at the predetermined angular position of the support shaft, a manually controllable remotely located switching member operative to reinitiate the flow of current to the solenoid after it is shut off by the pin controlled switch, connected to the pin controlled switch, and means mounted on the support shaft operative to transmit to an externally mounted apparatus the switching steps established by the solenoid and time delay relay combination.

17. A stepper switching apparatus comprising an electrically energized solenoid coil having a plunger reciprocatingly fitted thereto, a time delay relay mounted adjacent the solenoid coil, said time delay relay having a plunger reciprocatingly fitted thereto in operative alignment with the solenoid plunger, means mounted in said time delay relay operative to establish a time interval for controlling the energizing of the solenoid, the energizing of the solenoid coil being operative to move the reciprocating plunger thereof in one direction, the reciprocating plunger of the time delay relay being located in substantial axial alignment with the plunger of the solenoid, the solenoid plunger being operative to move the time delay relay plunger toward the relay when the solenoid coil is energized, switching means mounted in the time delay relay operative to shut off the flow of current to the solenoid coil when the time delay relay plunger is moved through a predetermined distance toward the time delay relay, the time interval establishing means in the time delay relay being operative to engage the switching means mounted therein to reinitiate the flow of current to the solenoid coil when the established time interval has been completed, thus establishing a specific step in the operation of the stepper switching apparatus, a rotatable support shaft mounted substantially perpendicularly to the axis of the solenoid plunger, a ratchet member fixedly attached to the support shaft co-axially therewith, a pivoted control lever mounted between the solenoid plunger and the ratchet member, means pivotally connecting the solenoid plunger to the control lever, a spring supported toothed member attached to one end of the control lever operative to engage the ratchet member to progressively angularly move the ratchet member through predetermined angular increments, co-ordinated with the longitudinal movement of the solenoid plunger in one direction, a switch control member attached to the support shaft at a predetermined angular position thereof, a switch having an actuating member controllable by the switch control member attached to the support shaft, attached thereto, mounted adjacent the support shaft, the switch actuating member being in operative alignment with the switch control member attached to the support shaft, the switch being operative to shut off the flow of current to the time delay relay and the solenoid coil when the actuating member of the switch engages the control member attached to the support shaft at a predetermined angular position of the support shaft, a manually controllable remotely located switch operative to reinitiate the flow of current to the solenoid after it is shut off by the support shaft control member actuated switch, connected to the support shaft control member actuated switch, a plurality of control discs mounted on the support shaft concentrically therewith, each of said control discs having a plurality of equally-spaced, radially positioned tabs around the outer circumference thereof, the tabs being adapted to be individually selectively bent into a position substantially perpendicular to the control disc to establish a gap between the adjacent pair of tabs, a switching member mounted adjacent each of said control discs, each of said switching members having means pivotally attached thereto, in operative alignment with the outer circumference of each of the control discs, a portion of said pivoted means being adapted to selectively fit into the gaps between pairs of tabs on the adjacent control disc to transmit to an externally mounted apparatus the switching steps established by the solenoid coil and time delay relay combination.

18. A stepper switching apparatus comprising an electrically energized solenoid coil having a plunger reciprocatingly fitted thereto, a time delay relay mounted adjacent the solenoid coil, said time delay relay having a plunger reciprocatingly fitted thereto in operative alignment with the solenoid plunger, means mounted in said time delay relay adapted to establish a time interval for controlling the energizing of the solenoid, the reciprocating plunger of the time delay relay being located in substantial axial alignment with the plunger of the solenoid, the solenoid plunger being adapted to move the time delay relay plunger toward the relay when the solenoid is energized, switching means mounted in the time delay relay adapted to shut off the flow of current to the solenoid when the time delay relay plunger is moved through a predetermined distance toward the time delay relay, the time interval establishing means in the time delay relay being adapted to engage the switching means mounted therein to reinitiate the flow of current to the solenoid coil when the established time interval has been completed, thus establishing a specific step in the operation of the stepper switch apparatus, a rotatably mounted support shaft, a ratchet member fixedly attached to the support shaft co-axially therewith, a pivoted control lever mounted between the solenoid plunger and the ratchet member, means pivotally connecting the solenoid plunger to the pivoted control lever, a spring supported toothed member attached to one end of the pivoted control lever adapted to engage the ratchet member to progressively angularly move the ratchet member through predetermined angular increments co-ordinated with the longitudinal movement of the solenoid plunger in one direction, a radially positioned pin fixedly attached to the rotatable support shaft, and a switch adapted to engage the switch control member, said switch being adapted to shut off the flow of current to the solenoid when the actuating member of the switch engages the radially positioned pin at the predetermined angular position in the rotation of the support shaft, a plurality of control discs mounted on the rotatable support shaft concentrically therewith, each of said control discs having a plurality of radially positioned tabs around the outer circumference thereof, the tabs being adapted to be individually selectively bent into a position substantially perpendicular to the control disc to establish gaps between pairs of tabs, a switching member mounted adjacent each of said control discs, each of said switching members having an actuator arm attached thereto, the actuator arm having a rotatably supported control means attached to one end thereof in operative alignment with the outer circumference of the adjacent control disc, the control means of each of said switching members being adapted to selectively fit into gaps between pairs of tabs on the adjacent control disc to transmit to an externally mounted apparatus the switching steps established by the solenoid and time delay relay combination.

References Cited in the file of this patent

UNITED STATES PATENTS

| | | |
|---|---|---|
| 1,801,129 | Warren | Apr. 14, 1931 |
| 2,555,994 | Pennell | June 5, 1951 |
| 2,653,200 | Foster et al. | Sept. 22, 1953 |
| 2,742,538 | Grandstaff | Apr. 17, 1956 |